United States Patent [19]

Severson

[11] 3,994,777

[45] Nov. 30, 1976

[54] NUCLEAR REACTOR OVERFLOW LINE
[75] Inventor: Wayne J. Severson, Pittsburgh, Pa.
[73] Assignee: The United States of America as represented by the United States Energy Research and Development Administration, Washington, D.C.
[22] Filed: Feb. 12, 1976
[21] Appl. No.: 657,520

[52] U.S. Cl. .................................. 176/38; 176/40; 176/87
[51] Int. Cl.² ....................................... G21C 9/00
[58] Field of Search ................. 176/37, 38, 17, 40, 176/65, 87; 137/123, 386

[56] References Cited
UNITED STATES PATENTS
3,215,606  11/1965  Silvester .............................. 176/61
FOREIGN PATENTS OR APPLICATIONS
1,005,489  8/1965  United Kingdom .................... 176/65

OTHER PUBLICATIONS
"The Emergency Core-Cooling Problem" Reactor Technology, vol. 13, No. 3, Summer 1970.

Primary Examiner—Samuel W. Engle
Assistant Examiner—Ralph Palo
Attorney, Agent, or Firm—Dean E. Carlson; Arthur A. Churm; Frank H. Jackson

[57] ABSTRACT

The overflow line for the reactor vessel of a liquid-metal-cooled nuclear reactor includes means for establishing and maintaining a continuous bleed flow of coolant amounting to 5 to 10% of the total coolant flow through the overflow line to prevent thermal shock to the overflow line when the reactor is restarted following a trip. Preferably a tube is disposed concentrically just inside the overflow line extending from a point just inside the reactor vessel to an overflow tank and a suction line is provided opening into the body of liquid metal in the reactor vessel and into the annulus between the overflow line and the inner tube.

2 Claims, 2 Drawing Figures

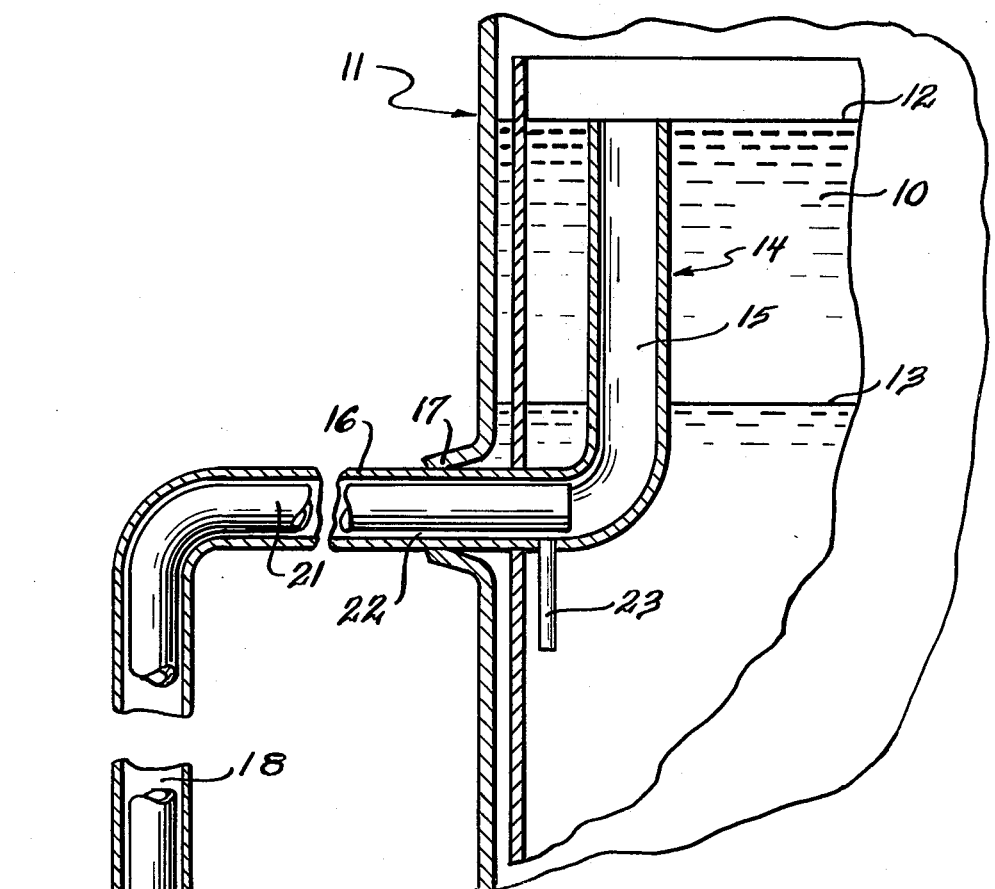
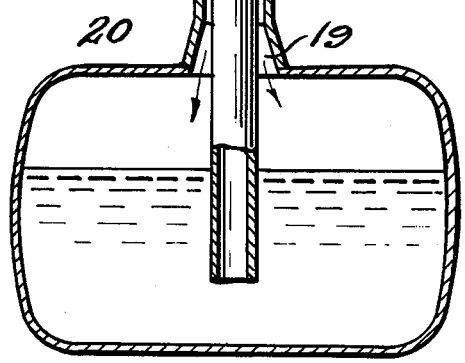
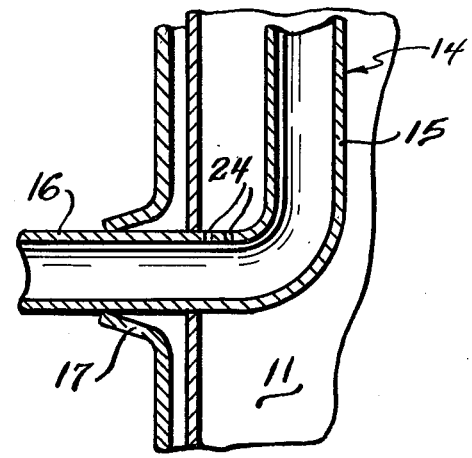

NUCLEAR REACTOR OVERFLOW LINE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an overflow line for the reactor vessel of a liquid-metal-cooled nuclear reactor. In more detail, the invention relates to an overflow line for the reactor vessel of a sodium-cooled nuclear reactor employing hot leg pumps including means for establishing and maintaining a continuous bleed flow of coolant through the overflow line.

The sodium level within the reactor vessel of a sodium-cooled nuclear reactor employing hot leg pumps is maintained by an overflow/makeup system with constant overflow during steady-state operation. An overflow line is installed in the reactor to limit the liquid level in the reactor vessel and a makeup system is provided to accommodate sodium volumetric changes due to temperature changes as the Reactor/Plant power level changes. Following plant trips wherein control rods are inserted and the main sodium circulating pumps are shut off, the sodium level in the reactor falls. This is due to: (a) The level in the hot leg free surface pumps rises; i.e., the pump drawdown vanishes. Refilling the pump tanks is essentially a shift in sodium inventory from the reactor vessel to the pump tank. (b) The shrinkage of sodium in the primary system as the temperature drops in the primary system — the ratio of the heat transfer rate in the intermediate heat exchanger to the decay power in the reactor is greater than one.

The drop in sodium level in the reactor vessel (which may be about two feet) interrupts the flow through the overflow line. By the time the flow is reestablished — about an hour — the sodium which first overflows the reactor vessel is considerably lower in temperature — on the order of 200° — than is the overflow line itself and the nozzle at the overflow tank which have remained hot. The sodium in the reactor vessel is continuously circulated through the intermediate heat exchanger after shutdown of the reactor — and thereby cooled — since the pumps continue to operate at shutdown speed. The flow of the cooler sodium through the hot overflow line and nozzle at the overflow tank which occurs when the reactor is restarted represents an undesirable thermal shock to the hardware in question.

SUMMARY OF THE INVENTION

The overflow line for the reactor vessel of a liquid-metal-cooled nuclear reactor includes means for establishing and maintaining a continuous bleed flow of coolant amounting to 5 to 10% of the total coolant flow through the overflow line to prevent thermal shock to the overflow line when the reactor is restarted following a trip. Preferably a tube is disposed concentrically just inside the overflow line extending from a point just inside the reactor vessel to an overflow tank and a suction line is provided opening into the body of liquid metal in the reactor vessel and into the annulus between the overflow line and the inner tube.

BRIEF DESCRIPTION OF THE DRAWINGS

FIG. 1 is a diagrammatic view of an overflow line for a sodium-metal-cooled nuclear reactor according to the present invention, and FIG. 2 is a detail of an alternative embodiment thereof.

DESCRIPTION OF THE INVENTION

Referring now to FIG. 1 of the drawing, a sodium-cooled nuclear reactor (not shown) is immersed in a body of sodium 10 contained within a reactor vessel 11 up to a normal, operating level 12 or a trip, emergency level 13. Operating level 12 is established and maintained by overflow line 14 having a vertical portion 15 disposed within reactor vessel 11, a horizontal portion 16 extending through a nozzle 17 on the side wall of the reactor vessel and a second vertical portion 18 extending downwardly and terminating in a nozzle 19 on the top of an overflow tank 20. According to the present invention, overflow line 14 is fitted with an inner tube 21 extending from a point a short distance inside the reactor vessel into the lower portion of overflow tank 20, creating an annulus 22 between the overflow line and the inner tube. Also an orificed suction line 23 depends from horizontal portion 16 of overflow line 14 opening into the body of sodium 10 and annulus 22. When the liquid level falls below the top of overflow line 14, sodium continues to flow through suction line 23 and annulus 22 into overflow tank 20. Thus overflow line 14 and nozzles 17 and 18 are continuously in contact with sodium from the pool of sodium in reactor vessel 11 and as this sodium cools so are the overflow line and nozzles cooled. This prevents thermal shock from occurring when the reactor is restarted following a reactor trip. Suction line 23 is orificed so that flow through annulus 22 is about 5 to 10% of the total flow through the overflow line. The annulus is so dimensioned that this flow is sufficient to completely fill the annulus, thereby cooling the entire overflow line. Flow through annulus 22 is continuous at all times with the major portion of the flow going through inner tube 21 when the level of sodium in the reactor vessel is at the operating level.

An alternative construction is shown in FIG. 2. According to this embodiment, inner tube 21 is eliminated and openings 24 are provided in the horizontal portion 16 of overflow line 14 within the reactor vessel, the size thereof being set to provide about 5 to 10% of the total normal flow of sodium through the overflow line 14.

The embodiments of the invention in which an exclusive property or privilege is claimed are defined as follows:

1. In a liquid-metal-cooled nuclear reactor including a reactor vessel having an overflow line establishing therein a liquid level for steady state operation, the improvement comprising a tube concentrically disposed in the overflow line establishing an annulus between the overflow line and the tube and an orificed suction line opening to the body of liquid metal within the reactor vessel and to said annulus, said concentric tube extending from a point inside the reactor vessel past the orificed suction line to the interior of the overflow tank positioned outside the reactor vessel whereby a continuous bleed flow of liquid metal is established through said annulus to prevent thermal shock to the overflow line when the reactor is restarted following a trip.

2. The improvement of claim 1 wherein said suction line is orificed to permit 5 to 10% of the total coolant flow through the overflow line to flow through the annulus.

* * * * *